US006732702B2

(12) United States Patent
Liu et al.

(10) Patent No.: US 6,732,702 B2
(45) Date of Patent: May 11, 2004

(54) COMBUSTION CHAMBER

(75) Inventors: Zhengbai Liu, Lisle, IL (US); Xinqun Gui, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 63 days.

(21) Appl. No.: 10/057,545

(22) Filed: Jan. 23, 2002

(65) Prior Publication Data

US 2003/0136372 A1 Jul. 24, 2003

(51) Int. Cl.[7] .................................................. F02F 3/26
(52) U.S. Cl. ........................ 123/279; 123/282; 123/285
(58) Field of Search ................................ 123/279, 281, 123/282, 284, 285

(56) References Cited

U.S. PATENT DOCUMENTS 4,221,190 A * 9/1980 Komiyama et al. ......... 123/263
4,311,122 A * 1/1982 Banba et al. ............... 123/279
4,721,080 A 1/1988 Moriyasu et al.
4,883,032 A 11/1989 Hunter et al.
5,029,563 A 7/1991 Hu
5,285,755 A 2/1994 Regueiro
5,560,334 A * 10/1996 Daxer et al. ................ 123/279
5,657,726 A 8/1997 Diggs
5,868,112 A 2/1999 Mahakul et al.
5,954,038 A 9/1999 Warwick et al.

* cited by examiner

*Primary Examiner*—Bibhu Mohanty
(74) *Attorney, Agent, or Firm*—Dennis Kelly Sull; Susan L. Lukasik; Jeffrey P. Calfa

(57) ABSTRACT

A combustion chamber assembly for use in a diesel engine includes a combustion chamber defined in a crown of a piston, the combustion chamber having a center portion, the center portion being defined at least in part by a portion of a convex sphere, the sphere having a radius and an origin, the origin of the radius lying on a piston central axis and the combustion chamber further having an outwardly radially disposed bottom margin, the bottom margin being defined in part by a portion of an annulus, the annulus having a radius and an origin. The combustion chamber further has a plurality of curved surfaces having smooth transitions between adjacent smooth surfaces, the smooth surfaces including the spherical center portion and the annular bottom margin. A piston incorporating the aforementioned combustion chamber and a method of forming the combustion chamber are further included.

58 Claims, 3 Drawing Sheets

COMBUSTION CHAMBER

TECHNICAL FIELD

The present invention relates to a piston designed for use in a compression ignition (diesel) internal combustion engine. More particularly, the present invention relates to a combustion chamber defined in the crown of a piston.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the NOx entrained in the engine exhaust and minimizing the amount of soot particulate also entrained in the engine exhaust.

It is known that changes in any one of a variety of engine design/operating variables, such as engine compression, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the NOx emissions from the engine. Ever increasing regulatory demands mandate reduced levels of NOx. Typically, a combustion chamber design that is effective at reducing NOx levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in NOx and entrained soot while at the same time maintaining or enhancing engine torque and power outputs.

SUMMARY OF THE INVENTION

The piston of the present invention substantially meets the aforementioned needs of the industry. The combustion chamber of the present invention defined in the crown of the piston has been shown by substantiated simulation to both reduce soot entrainment and NOx emissions while at the same time maintaining engine power output. The corresponding diesel engine experimental results support the simulation. The piston has been shown to function effectively with cylinder heads having two or more valves. A further advantage of the piston of the present invention is that by being symmetrical with respect to a piston central axis, the combustion chamber is relatively easily formed in the crown of the piston. The piston and combustion chamber of the present invention are preferably used in heavy-duty and medium-duty diesel engines.

The present invention is a combustion chamber assembly for use in a diesel engine includes a combustion chamber defined in a crown of a piston, the combustion chamber having a center portion, the center portion being defined at least in part by a portion of a convex sphere, the sphere having a radius and an origin, the origin of the radius lying on a piston central axis and the combustion chamber further having an outwardly radially disposed bottom margin, the bottom margin being defined in part by a portion of an annulus, the annulus having a radius and an origin. The combustion chamber further has a plurality of curved surfaces having smooth transitions between adjacent smooth surfaces, the smooth surfaces including the spherical center portion and the annular bottom margin. The present invention is further a piston incorporating the aforementioned combustion chamber and a method of forming the combustion chamber.

DETAILED DESCRIPTION OF THE DRAWINGS

Figure 1:
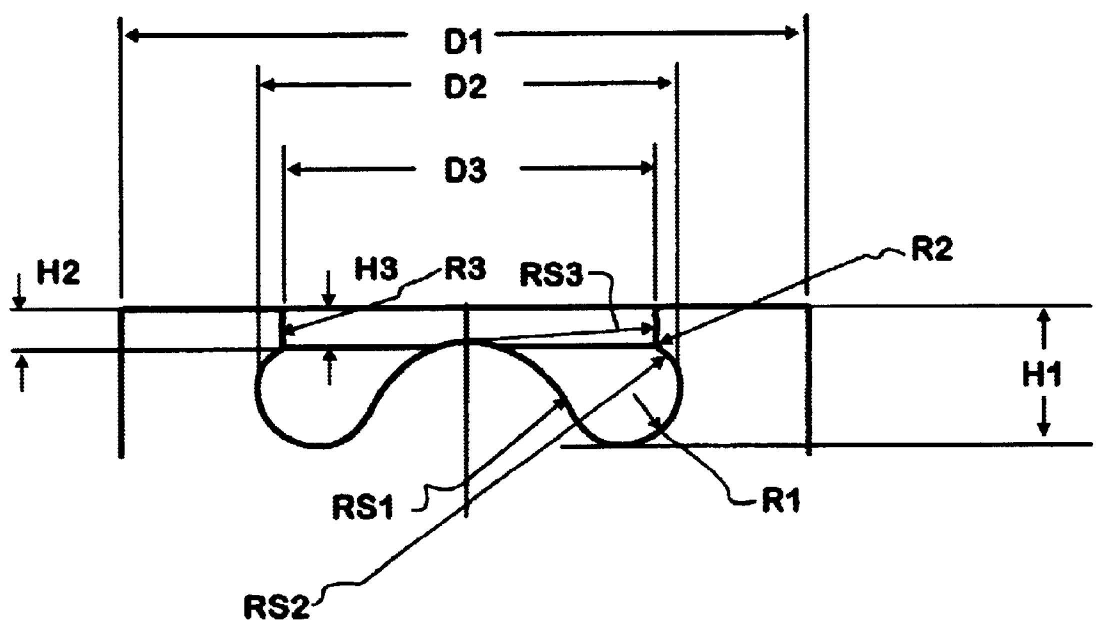
FIG. 1 is a sectional view of the piston and combustion chamber of the present invention.

The piston of the present invention is shown generally at 10 in FIG. 1. Generally, the piston 10 has a centrally located symmetrical upward directed cavity for forming a portion of a combustion chamber 12 within a cylinder of a diesel engine. The combustion chamber 12 is defined in the crown 12 of the piston 10. The engine has a fuel injector for forming a fuel injection plume relative to the combustion chamber 12. The piston 10 may be utilized with two-valve or multiple-valve heads. It is desirable that the fuel be injected proximate the center of the piston and that the injection pattern be radially symmetrical relative to the axis 1. The piston 10 is effective at reducing diesel engine pollutant emissions, such as NOx and soot, as depicted in the graphic representations of FIGS. 3 and 4. The piston 10 is preferably applicable to heavy-duty and medium duty diesel engines.

The crown 12 of the piston 10 defines in part the upper margin of the piston 10. The combustion chamber 12 of the present invention is defined in the crown 12. It should be noted that the combustion chamber 12 is symmetrical about the longitudinal axis 16 and that longitudinal axis 16 is coincident with the center axis of the piston 10. The various radii (R), diameters (D), and heights (H) that will be described below are clearly indicated in the depiction of FIG. 1. RS indicates a spherical radius and annular surfaces are indicated by R.

The combustion chamber 12 of the piston 10 is comprised of curved surfaces, including spherical surfaces. The combustion chamber 12 has no flat surfaces. There is a smooth, generally tangential transition between the various curved surfaces that define the combustion chamber 12, as described in greater detail below.

Generally, the combustion chamber 12 is comprised of four groups of triple parameters, as depicted in FIG. 1, including the diameter group;

the sphere group;

the height group; and the annulus group.

The diameter group is comprised of three diameter parameters, in which D1 is the piston 10 diameter, D2 is the combustion chamber 12 diameter, and D3 is the diameter of the reentrancy of the combustion chamber 12 where the combustion chamber 12 intersects the crown 14. The sphere group includes three spherical surfaces with radii of RS1, RS2, and RS3 respectively. The height group is comprised of three height parameters in which H1 is the depth of the combustion chamber 12, H2 is the distance between the piston crown 14 and the top point of the convex spherical surface RS1, and H3 is the thickness of the reentrancy of the combustion chamber 12. The annulus group includes three annular surfaces R1, R2, and R3 respectively.

The convex spherical surface RS1 is located at the center of the bottom of the combustion chamber 12. The two spherical surfaces RS2 and RS3 respectively form the side wall of the combustion chamber 12. The two spherical surfaces RS2 and RS3 are connected by the annular surface R1. The annular surface R1 forms the bottom portion of the combustion chamber 12. The two spherical surfaces RS2 and RS3 are connected by a small annular surface R2, thereby defining a smooth transition between the two spherical surfaces RS2 and RS3. The spherical surface RS3 transitions to the crown 14 by means of the small annular surface R3. The centers of the three spherical surfaces RS1, RS2, and RS3 are all located on the axis 16, defining the centerline of the combustion chamber 12.

The following relationship of parameters controls the geometry of the combustion chamber 12 and the resultant emissions in diesel engines employing the piston 10 and combustion chamber 12:

A. The ratio of D2:D1 is greater than 0.43 and is less than 0.83, and is preferably 0.631.

B. The ratio of D3:D2 is greater than 0.68 and is less than 0.998, and is preferably 0.883.

C. The ratio of RS1:D is greater than 0.08 and is less than 0.38, and is preferably 0.181.

D. The ratio of RS2:D2 is greater than 0.16 and is less than 0.56, and is preferably 0.364.

E. The ratio of RS3:D1 is greater than 0.18 and is less than 0.48, and is preferably 0.282.

F. The ratio of HR1:D2 is greater than 0.12 and is less than 0.52, and is preferably 0.321.

G. The ratio of H2:D1 is greater than 0.006 and is less than 0.256, and is preferably 0.056.

H. The ratio of H3:D1 is greater than 0.01 and is less than 0.45, and is preferably 0.05

I. The ratio of R1:D1 is greater than 0.02 and is less than 0.28, and is preferably 0.081.

J. The ratio of R2:D1 is equal to or greater than zero and less than 0.31, and is preferably 0.017.

K. The ratio of R3:D1 is equal to or greater than zero and less than 0.31, and is preferably 0.009.

The curves and smooth transitions of the combustion chamber 12 as previously described promote smooth flow in the combustion chamber 12 and act to reduce the thermal loading in the combustion chamber 12. Further, the combustion chamber 12 is symmetrical about the axis 16. Accordingly, it is much easier to turn the combustion chamber 12 as compared to an asymmetrical combustion chamber defined in a piston.

Figure 2:
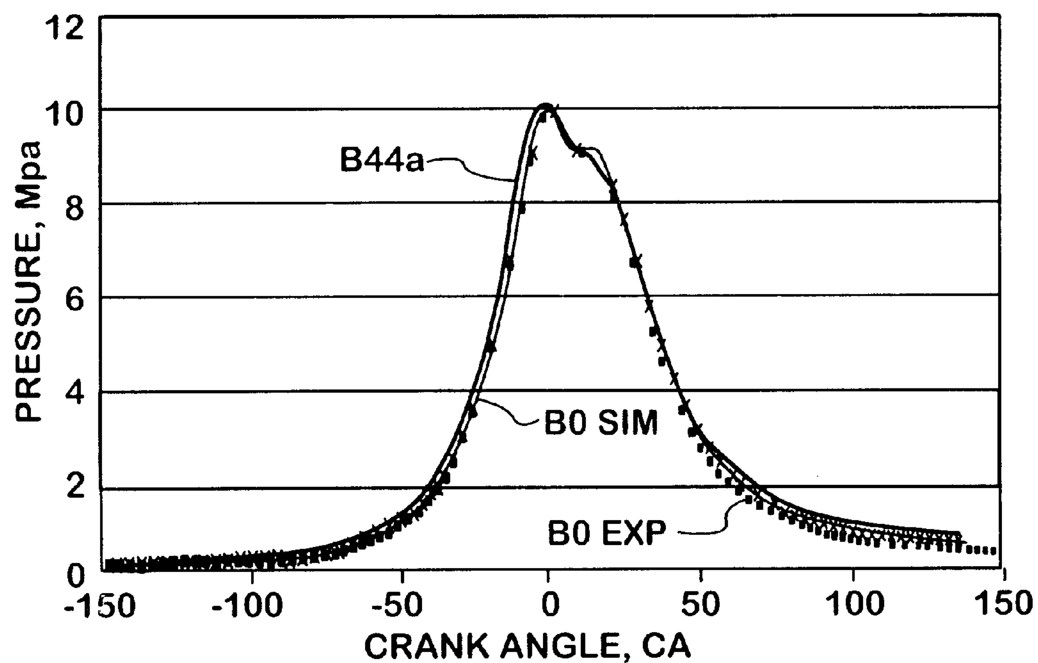
FIG. 2 is a graphic representation of pressure with respect to crank angle of empirical data of a prior art engine, B0, a simulation of the same engine to substantiate the validity of the simulation and a simulation of an engine with pistons and combustion chambers of the present invention, B44*a;*

FIG. 2 shows the comparison of the combustion performance as indicated by the in-cylinder pressure, where the area under a pressure curve represents the power output of a diesel engine. It should be noted in FIGS. 2, 3, and 4 that the simulations for prior art engine and the experimental results for the prior art engine are in substantial agreement as an indication of the validity of the simulation. Again in FIG. 2, the pressure curve of the present invention, B44*a* is slightly greater than that of the prior art engine, B0, which indicates that the performance of the present invention is somewhat better than the prior art engine. The power output of the present invention is slightly greater than the prior art engine.

Figure 3:
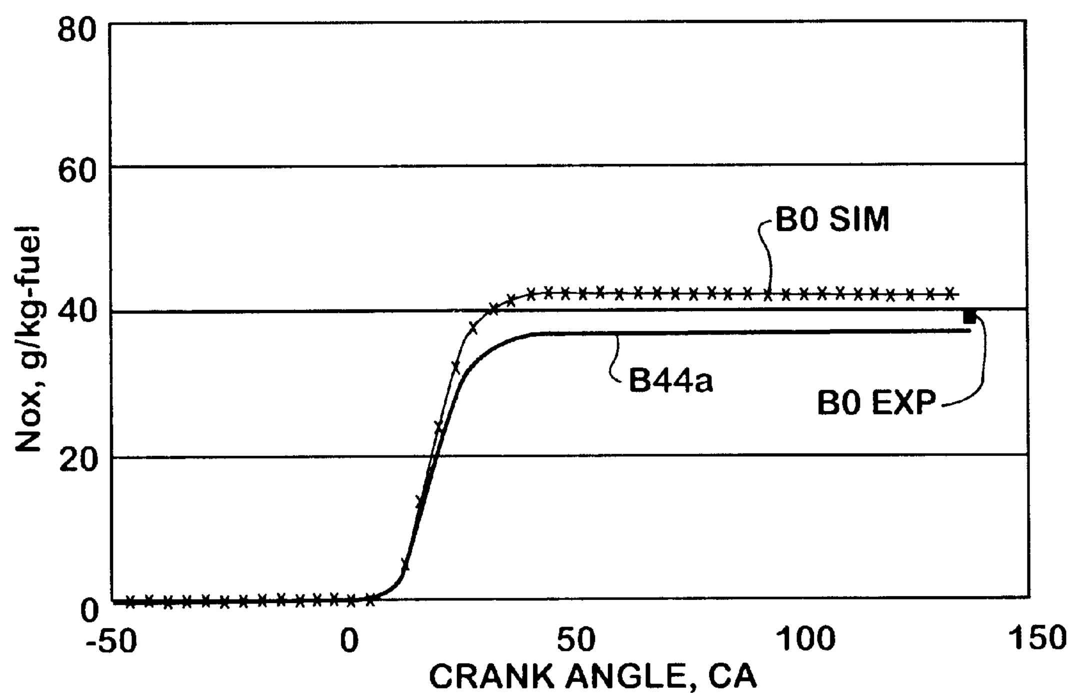
FIG. 3 is a graphic representation of an NOx generated by the prior art B0 piston and combustion chamber as compared to the piston and combustion chamber of the present invention, B44*a;*
Figure 4:
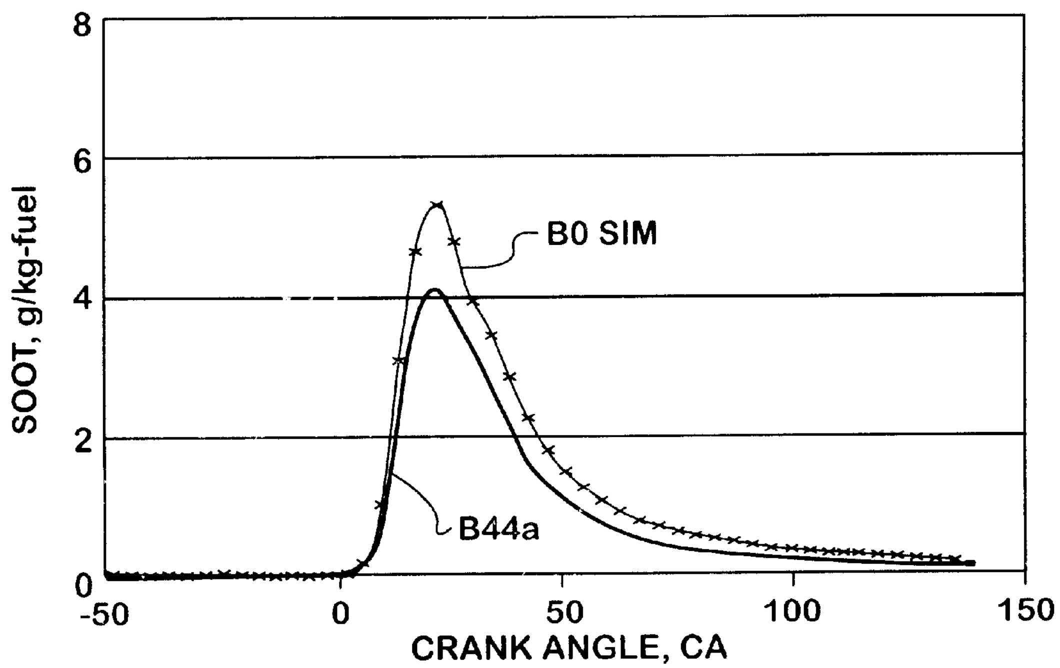
FIG. 4 is a graphic representation of the soot generated by the prior art B0 piston and combustion chamber as compared to the piston and combustion chamber of the present invention, B44*a*.

Combustion performance improvement and pollutant emission reduction are depicted in FIGS. 3 and 4. FIG. 3 depicts the NOx generation of a known combustion chamber as depicted by line B0 and the simulated results of NOx generation of the combustion chamber 12 of the present invention as depicted in line B44*a*. It is noted that the NOx generation by the combustion chamber 12 of the present invention is significantly less than the NOx of the known combustion chamber as depicted by line B0.

FIG. 4 depicts the simulated soot generation of a known combustion chamber as depicted by line B0 in comparison with the simulated soot generation of the combustion chamber 12 of the present invention as depicted by line B44*a*. It should be noted that soot generation of the combustion chamber 12 (line B44*a*) is significantly less than the soot generation of the known combustion chamber (line B0).

Figure 5:
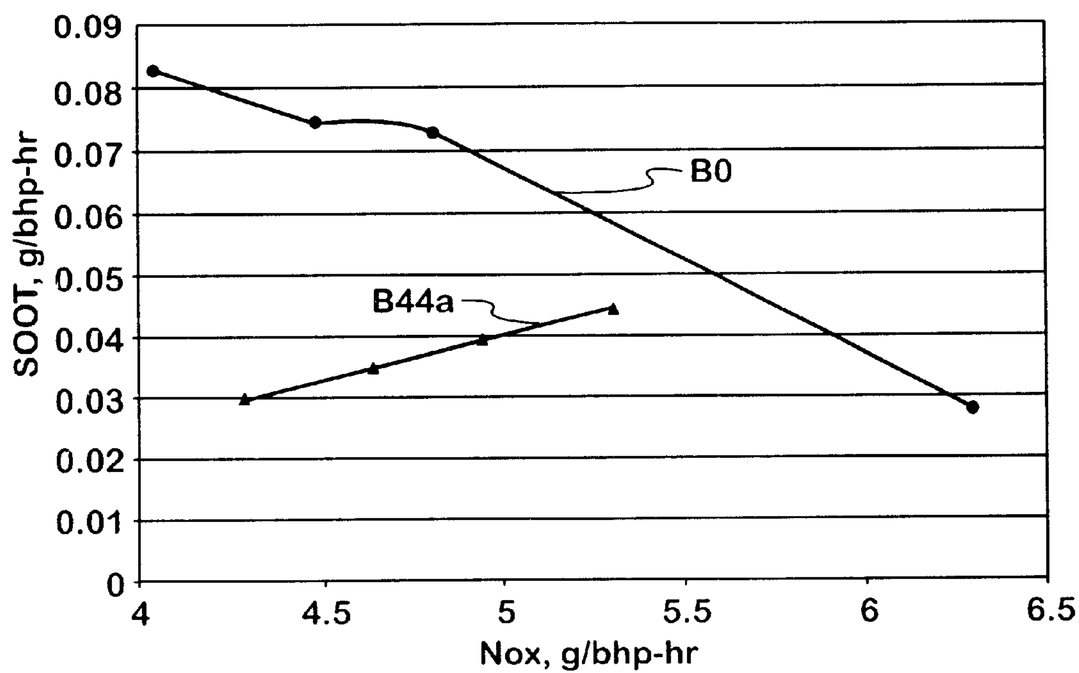
FIG. 5 is a graphic representation of the NOx and soot trade-off measured from the corresponding engine experiments at different conditions generated by the prior art B0 piston and combustion chamber as compared to the piston and combustion chamber of the present invention, B44*a*.

FIG. 5 depicts the experimental NOx and soot generation of a known combustion chamber as depicted by line B0 in comparison with the experimental NOx and soot generation of the combustion chamber 12 of the present invention as depicted by line B44*a* at different conditions. It should be noted that both NOx and soot generation of the combustion chamber 12 shown in line B44*a* are significantly less than the NOx and soot generation of the known combustion chamber shown in line B0.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a diesel engine, comprising:

a combustion chamber being defined in a crown of a piston by a plurality of surfaces, all said surfaces being free of straight surfaces, the combustion chamber having a center portion, the center portion being defined at least in part by a portion of a convex sphere, the sphere having a radius and an origin, the origin of the radius lying on a piston central axis and the combustion chamber further having an outwardly radially disposed bottom margin, the bottom margin being defined in part by a portion of an annulus, the annulus being concave and having an origin and a radius; and the combustion chamber having a plurality of curved surfaces only, the curved surfaces having smooth transitions between adjacent smooth surfaces, the smooth surfaces including the spherical center portion and the annular bottom margin.

2. The combustion chamber assembly of claim 1 wherein the origin of the centers of three spherical surfaces forming in part the combustion chamber lie on the center axis of the combustion chamber.

3. The combustion chamber assembly of claim 2 wherein the side wall portion of the combustion chamber is substantially defined by two of the three spherical surfaces.

4. The combustion chamber assembly of claim 3 wherein the two spherical surfaces substantially defining the side wall portion of the combustion are joined by an annular surface.

5. The combustion chamber assembly of claim 3 wherein a one of the two spherical surfaces substantially defining the side wall portion of the combustion is transitioned by an annular surface to a piston crown.

6. The combustion chamber assembly of claim 1 wherein the ratio of the radius of the center portion convex spherical surface, RS1, to the piston diameter, D1, of the combustion chamber is greater than 0.08 and less than 0.38.

7. The combustion chamber assembly of claim 6 wherein the ratio of the radius of the center portion convex spherical surface, RS1, the piston diameter, D1, of the combustion chamber is substantially .181.

8. The combustion chamber assembly of claim 1 wherein the ratio of the combustion diameter D2 to the piston diameter D1 is greater than 0.43 and less than 0.83.

9. The combustion chanter assembly of claim 8 wherein the ratio of the combustion diameter N to the piston diameter D1 is preferably substantially 0.631.

10. The combustion chamber assembly of claim 1 wherein the ratio of the diameter of the reentrancy D3 to the maximum combustion chamber diameter D2 is greater than 0.68 and less than 0.992.

11. The combustion chamber assembly of claim 10 wherein the ratio of the diameter of the reentrancy D3 to the maximum combustion chamber diameter D2 is substantially 0.883.

12. The combustion chamber assembly of claim 1 wherein the ratio of the radius of the center convex spherical surface RS1 to the diameter of the piston D1 is greater than 0.16 and less than 0.56.

13. The combustion chamber assembly of claim 12 wherein the ratio of the radius of the center convex spherical surface RS1 to the diameter of the piston D1 is substantially 0.364.

14. The combustion chamber assembly of claim 1 wherein the ratio of the spherical surface SR3 to the diameter of the piston D1 is between 0.18 and 0.48.

15. The combustion chamber assembly of claim 14 wherein the ratio of the spherical surface SR3 to the diameter of the piston D1 is preferably substantially 0.282.

16. The combustion chamber assembly of claim 1 wherein the ratio of the depth dimension of the combustion chamber H1 to the maximum diameter D2 of the combustion chamber is greater than 0.12 and less than 0.52.

17. The combustion chamber assembly of claim 12 wherein the ratio of the distance H1 to the diameter D2 of the combustion chamber is preferably substantially 0.321.

18. The combustion chamber of claim 1 wherein the ratio of the certain distance H2, H2 being the distance from a peak of the center portion convex spherical surface to the crown of the piston, to the diameter D1 of the piston is greater than .006 and less than .256.

19. The combustion chamber of claim 18 wherein the ratio of the certain distance H2 to the diameter D1 is preferably substantially 0.056.

20. The combustion chamber of claim 1 wherein the ratio of the certain distance H3, H being the thickness of the reentrancy of the combustion chamber, to the diameter D1 of the piston is greater than .001 and less than .045.

21. The combustion chamber of claim 20 wherein the ratio of the certain distance H3 to the diameter D1 is preferably substantially 0.05.

22. The combustion chamber of claim 1 wherein the ratio of the annular sidewall surface radius R1 tote diameter of the piston D1 is greater than 0.02 and less than 0.28.

23. The combustion chamber of claim 22 wherein the ratio of the radius R1 to the diameter D1 is preferably substantially 0.081.

24. The combustion chamber of claim 1 wherein the ratio of the annular surface radius R2 to the diameter of the piston D1 is greater than 0.0 and less than 0.31.

25. The combustion chamber of claim 24 wherein the ratio of the radius R2 to the diameter D1 is preferably substantially 0.017.

26. The combustion chamber of claim 1 wherein the ratio of the annular surface radius R3 to the diameter of the piston D1 is greater than 0.0 and less than 0.031.

27. The combustion chamber of claim 26 wherein the ratio of the radius R3 to the diameter D1 is preferably substantially 0.009.

28. A piston for use in a diesel engine, the piston having a central axis, comprising:

a combustion chamber being defined in a crown of the piston by a plurality of surfaces, all said surfaces being free of straight surfaces, the combustion chamber having a center portion being elevated relative to a bottom plane of the combustion chamber, the center portion being defined at least in part by a portion of a convex sphere, the sphere having a radius and an origin, the origin of the radius lying on the piston central axis;

the combustion chamber further having a bottom margin, the bottom margin being defined in part by a portion of an annular surface; and the combustion chamber having a plurality of curved surfaces only, the curved surfaces having smooth transitions between adjacent smooth surfaces, the smooth surfaces including the spherical center portion and the annular bottom margin and an annular sidewall.

29. The piston of claim 28, wherein the origin of the centers of three spherical surfaces forming in part the combustion chamber lie on the center axis of the combustion chamber.

30. The piston of claim 29 wherein the side wall portion of the combustion chamber is substantially defined by two of the three spherical surfaces.

31. The piston of claim 30 wherein the two spherical surfaces substantially defining the side wall portion of the combustion are joined by an annular surface.

32. The piston of claim 30 wherein a one of the two spherical surfaces substantially defining the side wall portion of the combustion is transitioned by an annular surface to a piston crown.

33. The piston of claim 28 wherein the ratio of the radius of the center portion convex spherical surface, RS1, to the piston diameter, D1, of the combustion chamber is greater than 0.08 and less than 0.38.

34. The piston of claim 33 wherein the ratio of the radius of the center portion convex spherical surface, RS1, the piston diameter, D1, of the combustion chamber is substantially .181.

35. The piston of claim 28 wherein the ratio of the combustion diameter D2 to the piston diameter D1 is greater than 0.43 and less than 0.83.

36. The piston of claim 35 wherein the ratio of the combustion diameter D2 to the piston diameter D1 is preferably substantially 0.631.

37. The piston of claim 28 wherein the ratio of the diameter of the reentrancy D3 to the maximum combustion chamber diameter D2 is greater than 0.68 and less than 0.998.

38. The piston of claim 37 wherein the ratio of the diameter of the reentrancy D3 to the maximum combustion chamber diameter D2 is substantially 0.883.

39. The piston of claim 28 wherein the ratio of the radius of the center convex spherical surface RS1 to the diameter of the piston D1 is greater than 0.16 and less than 0.56.

40. The piston of claim 39 wherein the ratio of the radius of the center convex spherical surface RS1 to the diameter of the piston D1 is substantially 0.364.

41. The piston of claim 28 wherein the ratio of the spherical surface SR3 to the diameter of the piston D1 is between 0.18 and 0.48.

42. The piston of claim 41 wherein the ratio of the spherical surface SR3 to the diameter of the piston D1 is preferably substantially 0.282.

43. The piston of claim 28 wherein the ratio of the depth dimension of the combustion chamber H1 to the maximum diameter D2 of the combustion chamber is greater than 0.12 and less than 0.52.

44. The piston of claim 43 wherein the ratio of the distance H1 to the diameter D2 of the combustion chamber is preferably substantially 0.321.

45. The piston of claim 28 wherein the ratio of the certain distance H2, H2 being the distance from a peak of the center portion convex spherical surface to the crown of the piston, to the diameter D1 of the piston is greater than .006 and less than .256.

46. The piston of claim 45 wherein the ratio of the certain distance H2 to the diameter D1 is preferably substantially 0.056.

47. The piston of claim 28 wherein the ratio of the certain distance H3, H being the thickness of the reentrancy of the combustion chamber, to the diameter D1 of the piston is greater than .001 and less than 045.

48. The piston of claim 47 wherein the ratio of the certain distance H3 to the diameter D1 is preferably substantially 0.05.

49. The piston of claim 28 wherein the ratio of the annular sidewall surface radius R1 to the diameter of the piston D1 is greater than 0.02 and less than 0.28.

50. The piston of claim 49 wherein the ratio of the radius R1 to the diameter D1 is preferably substantially 0.081.

51. The piston of claim 28 wherein the ratio of the annular surface radius R2 to the diameter of the piston D1 is greater than 0.0 and less than 0.31.

52. The piston of claim 51 wherein the ratio of the radius R2 to the diameter D1 is preferably substantially 0.017.

53. The piston of claim 28 wherein the ratio of the annular surface radius R3 to the diameter of the piston D1 is greater than 0.0 and less than 0.031.

54. The piston of claim 53 wherein the ratio of the radius R3 to the diameter D1 is preferably substantially 0.009.

55. A method of forming a combustion chamber for use in a diesel engine, comprising:

defining a combustion chamber in a crown of a piston by plurality of surface, all said surfaces being free of straight surfaces, the piston having a central axis, defining the combustion chamber by the steps of:

defining a combustion chamber elevated center portion;

defining the center portion at least in part by a portion of a convex sphere, the sphere having a radius, defining a combustion chamber bottom margin in part by a concave annular surface, the annular surface having a radius;

locating the origin of convex sphere radius on the piston central axis; and defining a plurality of combustion chamber curved surfaces only, the curved surfaces having smooth transitions between adjacent smooth surfaces, the smooth surfaces including the spherical center portion, the annular surface bottom margin, and a sidewall annular surface.

56. The method of claim 55 including defining the combustion chamber by a plurality of spherical surfaces and a plurality of annular surfaces.

57. The method of claim 55 including defining the combustion chamber by three spherical surfaces and three annular surfaces.

58. The method of claim 57 including disposing the respective origins of the spherical surfaces on the piston center.

* * * * *